United States Patent
Tamada et al.

(10) Patent No.: US 7,370,893 B2
(45) Date of Patent: May 13, 2008

(54) IMPACT ABSORBING MEMBER FOR MOTOR VEHICLE

(75) Inventors: Teruo Tamada, Yokohama (JP); Hiroo Inui, Nagoya (JP); Hitoshi Suga, Toyota (JP)

(73) Assignee: Kyoraku Co., Ltd., Tokyo (JP)

( * ) Notice: Subject to any disclaimer, the term of this patent is extended or adjusted under 35 U.S.C. 154(b) by 227 days.

(21) Appl. No.: 10/553,544
(22) PCT Filed: May 13, 2004
(86) PCT No.: PCT/JP2004/006776

§ 371 (c)(1),
(2), (4) Date: Oct. 19, 2005

(87) PCT Pub. No.: WO2004/101323
PCT Pub. Date: Nov. 25, 2004

(65) Prior Publication Data
US 2006/0255601 A1    Nov. 16, 2006

(30) Foreign Application Priority Data

| May 14, 2003 | (JP) | ............................ 2003-135249 |
| Oct. 31, 2003 | (JP) | ............................ 2003-373396 |
| Dec. 26, 2003 | (JP) | ............................ 2003-435957 |

(51) Int. Cl.
B60R 19/03    (2006.01)
(52) U.S. Cl. ...................................... 293/120; 293/133
(58) Field of Classification Search ................ 293/102, 293/120, 133, 134, 135, 136
See application file for complete search history.

(56) References Cited

U.S. PATENT DOCUMENTS 6,406,079 B2    6/2002    Tamada et al.
2004/0174025 A1    9/2004    Converse et al.

FOREIGN PATENT DOCUMENTS

JP    56103349 U    8/1981

(Continued)

Primary Examiner—Lori L. Lyjak
(74) Attorney, Agent, or Firm—Vern Maine & Associates

(57) ABSTRACT

The invention provides an impact absorbing member of a motor vehicle which can correspond to an energy caused by a low impact value (5 kN or lower) as well as absorbing an energy caused by a high impact value (20 kN or higher) at a time of being collided with and brought into contact with the other motor vehicle or the other body, can secure a desired impact absorbing performance even in the case that a thickness of an impact absorbing member is limited, is particularly excellent in an impact absorbing performance just after an impact is applied, and is excellent in a functionality and a styling characteristic which can maintain a high impact absorbing performance.

An impact absorbing member (1, 11) of a motor vehicle is interposed between a bumper facia (2, 12) and a vehicle body so as to absorb an impact, and is constituted by a bumper beam (3, 13) arranged in a side of the vehicle body, and a hollow body (4, 14) arranged in a side of the bumper facia (2, 12). The hollow body (4, 14) structuring the impact-absorbing member (1, 11) for the vehicle is formed by blow molding thermoplastic plastics. A plurality of concave ribs constituted by one concave ribs (5, 15) and the other concave ribs (6, 16) having weld surfaces (7, 17) which are depressed to an inner side in an opposing manner and are welded to each other are provided in a first wall (8, 18) in a side of the bumper facia (2, 12) and a second wall (9, 19) in a side of the bumper beam in the hollow body (4, 14). Further, a connection rib (26) rising up in a forward moving direction of the motor vehicle is inter posed between the adjacent concave ribs. The concave ribs are arranged on a virtual straight line, and the connection rib (26) is also formed on the virtual straight line. Further, one plate-like rib (22) and the other plate-like rib (23) are formed in the first wall (8, 18) and the second wall (9, 19) so as to connect a plurality of concave ribs (5, 15). The one plate-like rib (22) and the other plate-like rib (23) are integrally formed by welding leading ends thereof to each other by a weld portion (24).

21 Claims, 18 Drawing Sheets

| | FOREIGN PATENT DOCUMENTS | | | | | |
|---|---|---|---|---|---|---|
| JP | 57032555 U | 2/1982 | | JP | 6328988 | 11/1994 |
| JP | 2046418 B | 3/1983 | | JP | 6344837 | 12/1994 |
| JP | 63018281 Y2 | 11/1983 | | JP | 10250513 | 9/1998 |
| JP | 58194942 U | 12/1983 | | JP | 11034140 | 9/1999 |
| JP | 4033165 Y2 | 12/1985 | | JP | 2000193057 | 7/2000 |
| JP | 2299947 | 12/1990 | | JP | 2001239573 | 9/2001 |
| JP | 2299948 | 12/1990 | | JP | 2001341516 | 11/2001 |
| JP | 5116572 | 5/1993 | | JP | 2002187508 | 7/2002 |
| JP | 6255433 | 9/1994 | | JP | 2002029340 | 10/2005 |
| | | | | WO | 2004080765 A1 | 9/2004 |

IMPACT ABSORBING MEMBER FOR MOTOR VEHICLE

RELATED APPLICATIONS

This application is a 35 U.S.C. 371 national phase application of PCT Application Serial Number PCT/JP2004/006776 filed 13 May 2004, which, claims priority to Japanese Application Nos. JP 2003-13549, filed 14 May 2003, JP 2003-373396, filed 31 Oct. 2003 and JP 2003-435957, filed 26 Dec. 2003. Each of these applications is herein incorporated in its entirety by reference.

TECHNICAL FIELD

The present invention relates to an impact absorbing member of a motor vehicle equipped in at least one of front and rear portions of the motor vehicle, which is interposed between a bumper facia and a vehicle body and can absorb and cushion an energy caused by an impact value in a wide range at a time of being collided with or brought into contact with the other motor vehicle or the other body applied to the bumper facia.

BACKGROUND ART

A bumper serving as an impact absorbing mechanism is equipped in the front and rear portions of the motor vehicle for absorbing and cushioning the impact generated at a time of being collided with or brought into contact with the other motor vehicle or the other body. Further, a bumper formed by bending a steel plate is used as a conventional bumper. However, in recent years, in proportion as a demand level against a car styling becomes higher, and a performance improvement on a safety and a grace of an outer shape are pursued, a bumper which is matched to a body styling in view of a shape, a color and the like is going to be demanded.

The bumper mentioned above is structured such that the bumper is covered with a bumper facia made of thermoplastic plastics, and an impact absorbing member is arranged in an inner portion thereof. The bumper facia is formed by injection molding or stamping a polypropylene or the other thermoplastic plastics. In recent years, there has been proposed a polymer alloy obtained by adding the polypropylene to the other composite resin, taking into consideration a recycle performance at a time of disposing a motor vehicle. Further, the impact-absorbing member employs various aspects in view of a performance and a cost, however, employs an aspect centering on a bumper beam as a general aspect.

As the bumper beam, in conventional, there has been frequently employed a structure formed by bending a steel plate as disclosed in Japanese Patent Application Laid Open (JP-A) No. 6-255433 and JP-A No. 6-328988, however, a synthetic resin bumper beam reinforced by a fiber group such as a glass fiber, a carbon fiber or the like starts being used as disclosed in JP-A No. 6-344837, JP-A No. 11-34140 and JP-A No. 2-299947.

It is a mainstream that the bumper beam is coated with a bumper facia in a surface thereof, however, a foam body for absorbing an energy may be interposed between the bumper beam and the bumper facia as disclosed in Japanese Utility Model Application Laid Open (JP-U) No. 56-103349 and JP-U No. 57-32555.

Further, in accordance with a new proposal, there is a blow molded bumper serving as a structure doubling as the bumper facia and the bumper beam by doing away with the bumper facia (JP-A No. 4-62029, JP-A No. 5-116572, Japanese Patent Application Publication No. 2-46418, JP-U No. 58-194942 and the like).

There is a proposal that the blow molded bumper is reinforced by a bumper beam as disclosed in Japanese Utility Model Application Publication No. 4-33165.

The conventional bumper system mentioned above can absorb and cushion an energy caused by a high impact value (20 kN or higher) at a time of being collided with and brought into contact with the other motor vehicle or the other body, however, it is hard to absorb and cushion the energy caused by a low impact value (5 kN or lower).

Further, there is described in JP-A No. 2002-187508 a structure having a hollow portion, integrated by forming concave ribs from a front surface wall and a back surface wall and bonding leading end portions thereof, and planning to improve an impact absorbing performance. Further, there is described in Japanese Patent No. 3313999 an impact-absorbing member for a vehicle structured by a polypropylene resin having an elastic modulus in bending of 5000 $kg/cm^2$ to 2500 $kg/cm^2$.

In this case, a duct for a vehicle forming a concave rib and a plate-like rib and having an impact absorbing performance is described in JP-A No. 2000-193057 and JP-A No. 2001-239573, a duct for a vehicle inserting a reinforcing core material and having an impact absorbing performance is described in JP-A No. 2001-34156, and a bumper reinforcement having a concave rib and a plate-like rib is described in Japanese Patent No. 2714567.

As the impact absorbing member for the vehicle described in JP-A No. 2002-187508 and Japanese Patent No. 3313999, the structure integrated by forming the concave rib from the front surface wall and the back surface wall of a hollow double wall structure body made of a thermoplastic resin and bonding the leading end portions to each other can secure a desired impact absorbing amount if a thickness of the hollow body is made sufficient, however, the desired impact absorbing amount can not be obtained in the case that the thickness of the hollow body is limited such as the case a space between the bumper facia and the bumper beam is little on styling, and it is required to improve the impact absorbing performance just after the impact is applied.

Accordingly, an object of the present invention is to obtain an impact absorbing member of a motor vehicle which can correspond to an energy caused by a low impact value (5 kN or lower, in particular between 3 kN and 5 kN) as well as absorbing an energy caused by a high impact value (20 kN or higher) at a time of being collided with and brought into contact with the other motor vehicle or the other body, can secure a desired impact absorbing performance even in the case that a thickness of an impact absorbing member or a hollow body is limited, is particularly excellent in an impact absorbing performance just after an impact is applied, and is excellent in a functionality and a styling characteristic which can maintain a high impact absorbing performance, by depressing a first wall of the hollow body toward an opposing second wall and depressing the second wall toward the opposing first wall so as to form a plurality of one concave ribs and a plurality of the other concave ribs, integrally welding leading end portions of the one concave ribs and the other concave ribs to each other, further protruding the first wall toward the opposing second wall and protruding the second wall toward the opposing first wall so as to form a pair of plate-like ribs constituted by one plate-like rib and the other plate-like rib in such a manner as to connect a plurality of concave ribs, and integrally welding leading end portions of the one plate-like rib and the other plate-like rib to each other.

SUMMARY OF THE INVENTION

In order to achieve the objects mentioned above, in accordance with a first aspect of the present invention, there is provided an impact absorbing member for a motor vehicle interposed between a bumper facia and a vehicle body so as to absorb an impact applied to the bumper facia, comprising:

a bumper beam arranged in a side of the vehicle body and made of a metal or a plastic; and a hollow body arranged in a side of the bumper facia and made of a plastic, wherein the hollow body is structured by a first wall in a side of the bumper facia and a second wall in a side of the bumper beam which are opposed to each other leaving a space, and a peripheral wall connecting peripheral edge portions of both the walls, and the first wall and the second wall are provided with a plurality of concave ribs depressed to an inner side in an opposing manner and having weld surfaces welded to each other.

In accordance with a second aspect of the present invention, there is provided an impact absorbing member for a motor vehicle interposed between a bumper facia and a vehicle body so as to absorb an impact applied to the bumper facia, comprising:

a bumper beam arranged in a side of the vehicle body and made of a metal or a plastic; and a hollow body arranged in a side of the bumper facia and made of a plastic, Wherein the hollow body is structured by a first wall in a side of the bumper facia and a second wall in a side of the bumper beam which are opposed to each other leaving a space, and a peripheral wall connecting peripheral edge portions of both the walls, a plurality of concave rib pairs constituted by one concave rib and the other concave rib are formed by depressing the first wall towards the second wall and depressing the second wall towards the first wall, the one concave rib and the other concave rib have weld surfaces in which leading end portions are integrally welded to each other, a pair of plate-like ribs constituted by one plate-like rib and the other plate-like rib are formed so as to connect a plurality of concave ribs by protruding the first wall toward opposing the second wall, and protruding the second wall toward opposing the first wall, and the one plate-like rib and the other plate-like rib have a weld portion in which leading end portions thereof are integrally welded to each other.

In accordance with a third aspect of the present invention, there is provided an impact absorbing member of a motor vehicle interposed between a bumper facia and a vehicle body so as to absorb an impact applied to the bumper facia, comprising:

a bumper beam arranged in a side of the vehicle body and made of a metal or a plastic; and a hollow body arranged in a side of the bumper facia and made of a plastic, wherein the hollow body is structured by a first wall in a side of the bumper facia and a second wall in a side of the bumper beam which are opposed to each other leaving a space, and a peripheral wall connecting peripheral edge portions of both the walls, and the first wall and the second wall are provided with a plurality of concave ribs depressed toward an inner side of a hollow portion in an opposing manner and having weld surfaces welded to each other, a plurality of plate-like ribs protruding toward the inner side of the hollow portion in an opposing manner and having weld portions in which leading ends thereof are welded to each other, and a connection rib depressed toward the inner side of the hollow portion and formed in a concave groove shape.

In accordance with a fourth aspect of the present invention, there is provided an impact absorbing member of a motor vehicle as recited in the first, second or third aspect, wherein a height (b) from the first wall to the weld surface in the one concave rib formed in the hollow body is between 15.0 and 35.0 mm, a height (c) from the second wall to the weld surface in the other concave rib is between 15.0 and 35.0 mm, and an average interval (a) from the first wall to the second wall in the impact absorbing member is between 30.0 and 70.0 mm.

In accordance with a fifth aspect of the present invention, there is provided an impact absorbing member of a motor vehicle as recited in the first, second, third or fourth aspect, wherein the one concave rib formed in the hollow body is formed in an approximately cylindrical shape, the first wall and the second wall are provided with an approximately circular open hole in which a diameter (d) by the concave rib is between 15.0 and 30.0 mm, and the weld surfaces formed in the leading end portions of a pair of concave ribs are formed in an approximately circular shape in which a diameter (e) is between 5.0 and 15.0 mm.

In accordance with a sixth aspect of the present invention, there is provided an impact absorbing member of a motor vehicle as recited in the third, fourth or fifth aspect, wherein the connection rib formed in the hollow body is interposed between the adjacent concave ribs so as to rise up in a forward moving direction.

In accordance with a seventh aspect of the present invention, there is provided an impact-absorbing member of a motor vehicle as recited in the third, fourth, fifth or sixth aspect, wherein the connection rib is formed in a concave shape in which a depth is between 3.0 and 8.0 mm.

In accordance with an eighth aspect of the present invention, there is provided an impact absorbing member of a motor vehicle as recited in the third, fourth, fifth, sixth or seventh aspect, wherein the concave rib formed in the hollow body is arranged on a virtual straight line, and the connection rib is formed on the virtual straight line.

In accordance with a ninth aspect of the present invention, there is provided an impact-absorbing member of a motor vehicle as recited in the eighth aspect, wherein the virtual straight line formed in the hollow body has an angle within a range between 30 degree and 60 degree with respect to a horizontal line.

In accordance with a tenth aspect of the present invention, there is provided an impact absorbing member of a motor vehicle as recited in the eighth or ninth aspect, wherein an added length of all the connection ribs formed in the hollow body is within a range between 20% and 60% of an added length of all the virtual straight lines.

In accordance with an eleventh aspect of the present invention, there is provided an impact absorbing member of a motor vehicle as recited in the third, fourth, fifth, sixth or seventh aspect, wherein the connection rib formed in the hollow body is formed in a direction approximately orthogonal to the plate-like rib.

In accordance with a twelfth aspect of the present invention, there is provided an impact absorbing member of a motor vehicle as recited in the third, fourth, fifth, sixth, seventh, eighth, ninth, tenth or eleventh aspect, wherein the connection rib formed in the hollow body is formed only in the first wall.

In accordance with a thirteenth aspect of the present invention, there is provided an impact absorbing member of a motor vehicle as recited in the second, third, fourth or fifth aspect, wherein the plate-like rib formed in the hollow body is formed in a plate shape in which a thickness (f) is between 2.0 and 10.0 mm.

In accordance with a fourteenth aspect of the present invention, there is provided an impact absorbing member of a motor vehicle as recited in the second, third, fourth, fifth or thirteenth aspect, wherein the one plate-like rib or the other plate-like rib formed in the hollow body is formed in a concave groove shape.

In accordance with a fifteenth aspect of the present invention, there is provided an impact absorbing member of a motor vehicle as recited in the second, third, fourth, fifth or thirteenth aspect, wherein the one plate-like rib or the other plate-like rib formed in the hollow body is formed in a solid plate shape.

In accordance with a sixteenth aspect of the present invention, there is provided an impact absorbing member of a motor vehicle as recited in the second, third, fourth, fifth, thirteenth or fourteenth aspect, wherein a reinforcing core material is buried in the one plate-like rib or the other plate-like rib formed in the hollow body.

DETAILED DESCRIPTION

Figure 1:
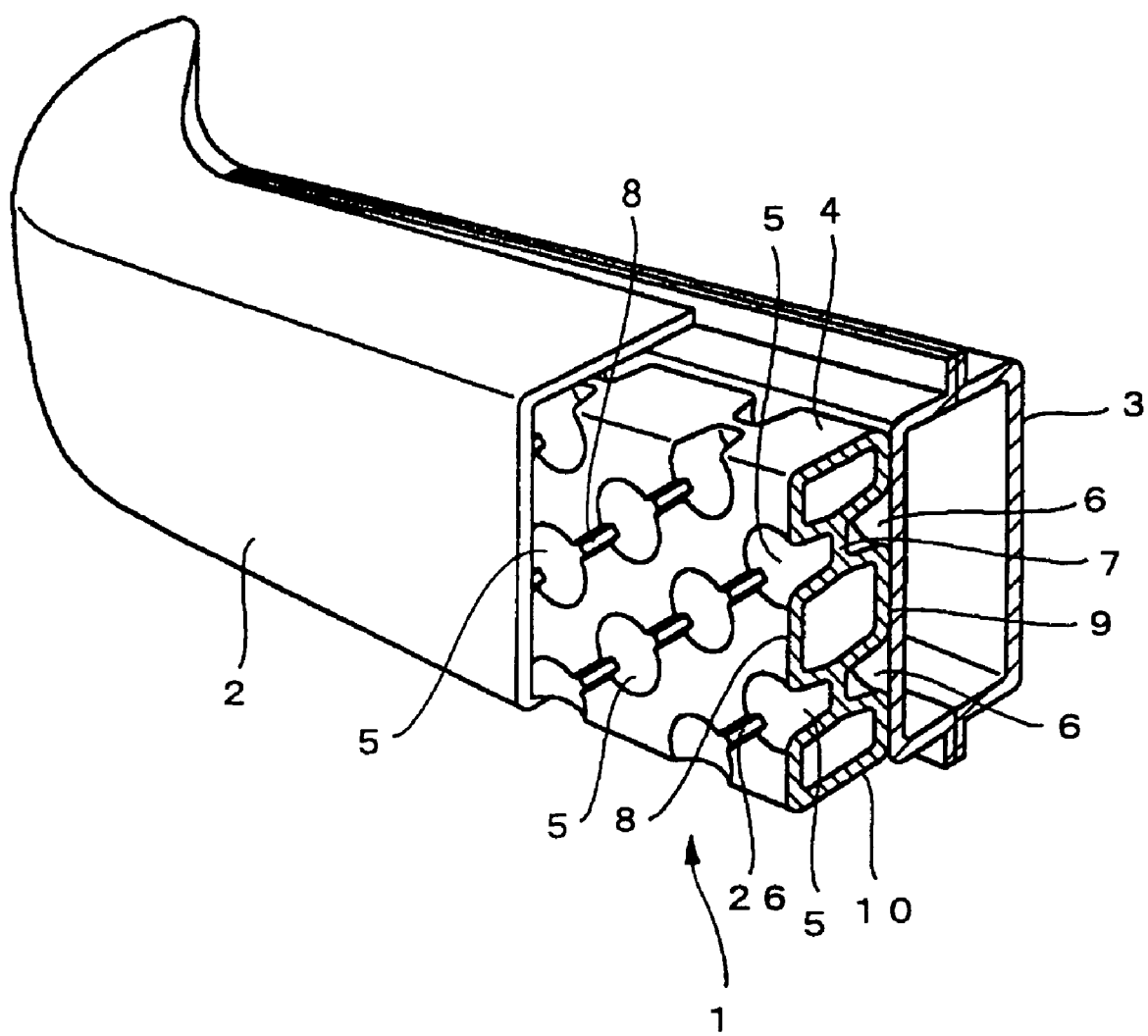
FIG. 1 is a broken perspective view showing a part of an impact-absorbing member of a motor vehicle in accordance with a first embodiment of the present invention.

In order to describe the present invention in more detail, a description will be given of the present invention with reference to the accompanying drawings.

As shown in FIGS. 1 to 5, in a first embodiment of the present invention, an impact absorbing member 1 of a motor vehicle is interposed between a bumper facia 2 and a vehicle body (not shown) so as to absorb an impact, and is constituted by a bumper beam 3 arranged in a side of a vehicle body, and a hollow body 4 arranged in a side of a bumper facia 2. The bumper facia 2 is made of plastic, the bumper beam 3 is made of metal or plastic, and the hollow body 4 is made of plastic. A thickness of the hollow body 4 is preferably in a range between 30.0 and 100.0 mm in view of a molding characteristic, and more preferably in a range between 30.0 and 70.0 mm, and a thickness thereof is preferably in a range between 0.3 mm and 6.0 mm, and more preferably in a range between 0.5 mm and 1.5 mm.

The hollow body 4 is constituted by a first wall 8 in a side of the bumper facia 2 and a second wall 9 in a side of the bumper beam 3 which are opposed to each other leaving a space, and a peripheral wall 10 connecting peripheral edge portions of both the walls. The first wall 8 and the second wall 9 have a plurality of rib pairs each constituted by one concave rib 5 and the other concave rib 6 which are depressed to an inner side in an opposing manner, and opposing one concave rib 5 and the other concave rib 6 are welded to each other in a weld surface 7. In other words, the first wall 8 and the second wall 9 are provided with a plurality of concave ribs which are depressed to an inner side in an opposing manner and are welded to each other.

Further, a second embodiment in accordance with the present invention is structured as shown in FIGS. 6 to 15. An impact absorbing member 11 of a motor vehicle is interposed between a bumper facia 12 and a vehicle body so as to absorb an impact in the same manner as the first embodiment, and is constituted by a bumper beam 13 arranged in a side of a vehicle body, and a hollow body 14 arranged in a side of the bumper facia 12.

The hollow body 14 is formed in a hollow shape by blow molding thermoplastic plastics. Reference numeral 21 denotes a hollow portion, reference numeral 18 denotes a first wall, reference numeral 119 denotes a second wall, and reference numeral 20 denotes a peripheral wall. The first wall 18 and the second wall 19 are connected by a peripheral wall 20 leaving a space. The hollow body 14 is structured such that the first wall 18 is arranged in a side of the bumper facia 12, and the second wall 19 is arranged in a side of the bumper beam 3.

The hollow body 14 has a plurality of concave ribs 15 and 16 which are formed by respectively depressing both the first wall 18 and the second wall 19 toward the other sides and are formed as approximately cylindrical pairs, and leading end portions of concave ribs 15 and 16 are brought into contact with each other so as to form a weld surface 17.

Further, one plate-like rib 22 is formed in the first wall 18 so as to connect between the respective concave ribs 15, the one plate-like rib 22 is formed in a groove shape having a narrow opposing width, and the opposing width f is between 2.0 and 10.0 mm including a thickness thereof. The other plate-like rib 23 is formed in the second wall 19 so as to connect between the respective concave ribs 16, the other plate-like rib 23 is also formed in a groove shape in the same manner as the one plate-like rib 22, and the opposing width f is between 2.0 and 10.0 mm including a thickness thereof. The one plate-like rib 22 and the other plate-like rib 23 are opposed to each other, and opposing end portions are integrally welded. Reference numeral 24 denotes a weld portion.

It is possible to achieve a desired impact absorbing performance without a lateral collapse of the concave ribs 15 and 16 even in the case that an impact direction at the time of being collided with the bumper facia is oblique with respect to the concave ribs 15 and 16 formed in the hollow body 14. It is possible to obtain a uniform impact absorbing force even in the case that where impact is applied to an optional position, by forming the weld surface 17, which is obtained by depressing both of the first wall 18 and the second wall 19 toward the other sides, bringing the leading end portions into contact with each other and integrally welding, and forming the weld portion 24 which is obtained by protruding both of the first wall 18 and the second wall 19 toward the inner side of hollow portion 14, bringing the leading end portions into contact with each other and integrally welding.

Figure 14:
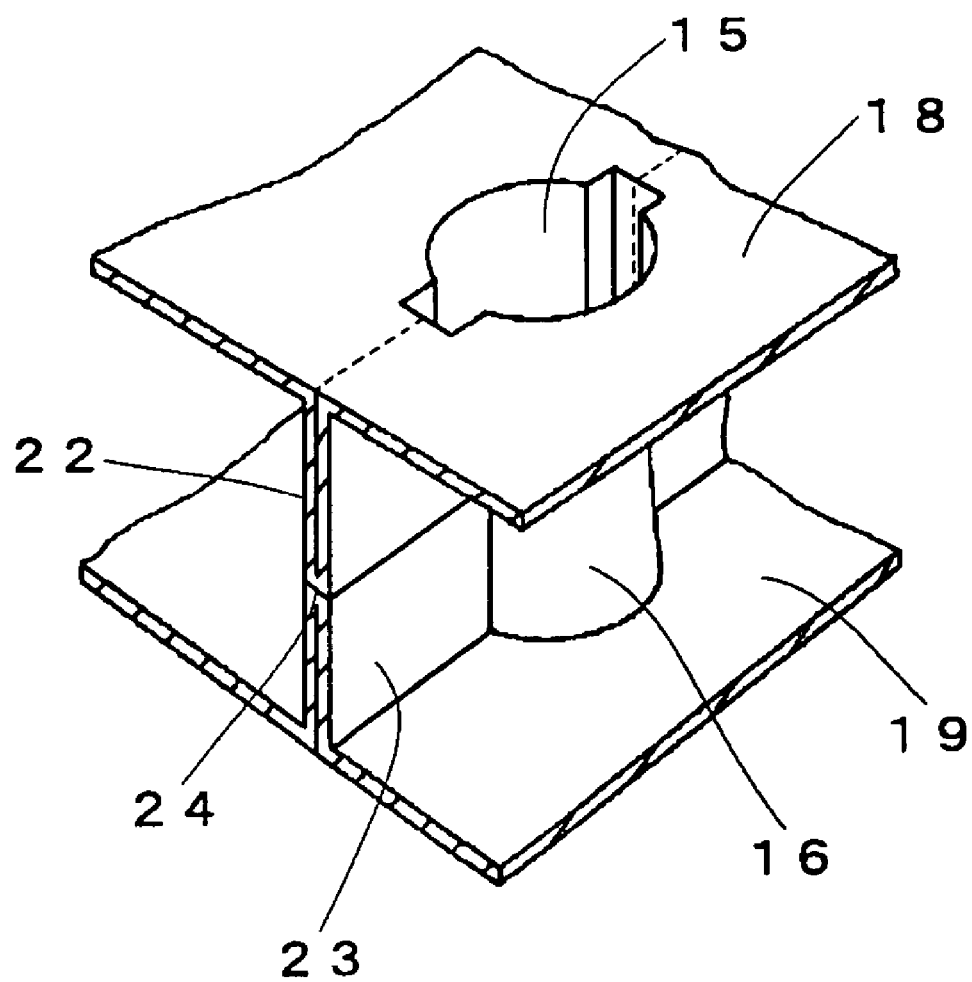
FIG. 14 is a broken perspective view showing a main portion of a hollow body in which a part of a plate-like rib in accordance with the second embodiment of the present invention is formed in a solid shape.
Figure 15:
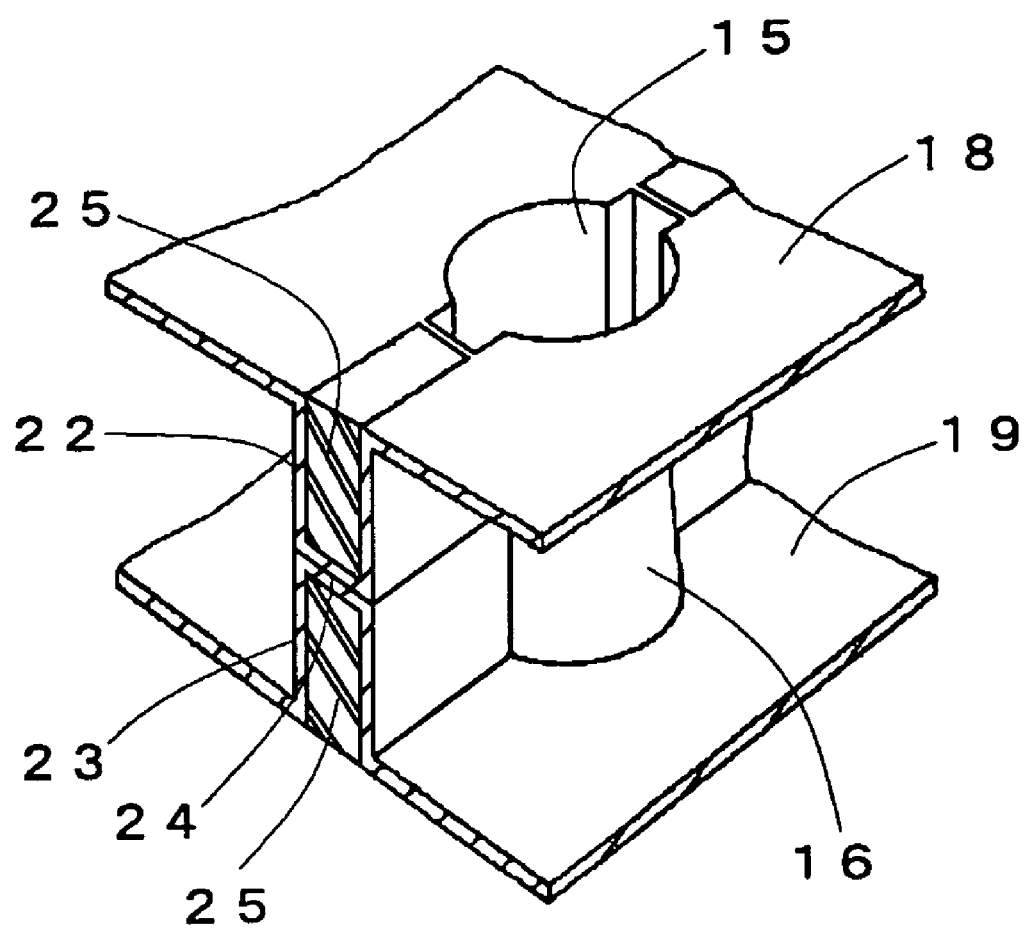
FIG. 15 is a broken perspective view showing a main portion of a hollow body in which a reinforcing core material is buried in the plate-like rib in accordance with the second embodiment of the present invention.

The one plate-like rib 22 and the other plate-like rib 23 which are formed in the hollow body 14 may be formed in a solid plate shape as shown in FIG. 14. Further, a reinforcing core material 25 constituted by a metal or plastic plate may be buried in the one plate-like rib 22 and the other plate-like rib 23, as shown in FIG. 15.

A height b from the first wall 8 or 18 to the weld surface 7 (17) in the one concave rib 5 or 15 formed in the hollow body 4 or 14 is between 15.0 and 35.0 mm, and a height c from the second wall 9 or 19 to the weld surface 7 or 17 in the other concave rib 6 or 16 is between 15.0 and 35.0 mm. Further, an average interval a from the first wall 8 or 18 to the second wall 9 or 19 is particularly preferably between 30.0 and 70.0 mm.

Further, an approximately circular open hole in which a diameter d is between 15.0 and 30.0 mm is provided in a pair of approximately cylindrical concave ribs 5 or 15 and 6 or 16 formed in the first wall 8 or 18 and the second wall 9 or 19, and the weld surfaces 7 or 17 formed in the leading end portions of a pair of concave ribs 5 or 15 and 6 or 16 are formed in an approximately circular shape in which a diameter e is between 5.0 and 15.0 mm, and it is preferable that the approximately cylindrical wall surfaces of a pair of concave ribs 5 or 15 and 6 or 16 are formed in a conical shape so as to connect the first wall 8 or 18 and the second wall 9 or 19 punched in an approximately circular shape with a slope to the weld surface 7 or 17 which is formed in an approximately circular shape.

In this case, the open holes and the weld surfaces 7 or 17 of the one concave rib 5 or 15 and the other concave rib 6 or 16 are not limited to the approximately circular shape as illustrated, but may be formed in an oval shape or a polygonal shape such as a hexagonal shape, an octagonal shape and the like.

In this case, a description will be given below of one example of the bumper facia 2 or 12, and the bumper beam 3 or 13.

The bumper beam 3 or 13 is made of metal or plastic. In the case of being made of metal, a structure member having a box-shaped cross section or the like can be used by welding a plate member having a C-shaped cross section and made of iron or an aluminum. In particular, in the case of using the metal having a high rigidity such as a high tensile steel or the like, the plate material can be made as thin as possible, and accordingly a weight saving can be achieved. Further, in the case of being made of plastic, it is preferable to employ a plastic having a high rigidity having an elastic modulus in bending equal to or higher than 4000 MPa and having a carbon fiber or a glass fiber contained. The bumper beam 3 or 13 may be formed in an elongated shape extending in a width direction of the vehicle body such as a box-shaped cross section or a C-shaped cross section, and may have a mounting portion mounted to the vehicle body.

The bumper facia 2 or 12 is formed by injection molding or stamping the polypropylene or the other thermoplastic plastic. Further, the surface of the bumper facia 2 is coated with paint in correspondence to the vehicle body of the motor vehicle, however, the paint resin can be simultaneously treated by using a polymer alloy resin adding the other composite resin to the polypropylene, taking into consideration a recycle characteristic at a time of disposing the motor vehicle.

The hollow body 4 or 14 can be formed by the resin as far as the resin can be blow molded, and is structured by a resin having a high mechanical strength such as a rigidity or the like, for example, a polyolefin resin such as a polyethylene, a polypropylene and the like, a styrene resin such as a polystyrene, an ABS resin and the like, a polyester resin such as a polyethylene terephthalate and the like, a polyamide and the like, particularly by thermoplastic plastics having the elastic modulus in bending between 800 and 2500 MPa. However, taking the recycle characteristic into consideration, it is preferable to employ the polypropylene, the polyethylene, a polymer alloy based thereon or a polyolefin resin such as a blend material or the like.

Further, in the first and second embodiments in accordance with the present invention, a concave groove-like connection rib 26 rising up in a forward moving direction of the motor vehicle may be interposed between at least one pair of adjacent concave ribs 5 and 5 or 15 and 15, and at least one pair of adjacent other concave ribs 6 and 6 or 16 and 16.

Figure 11:
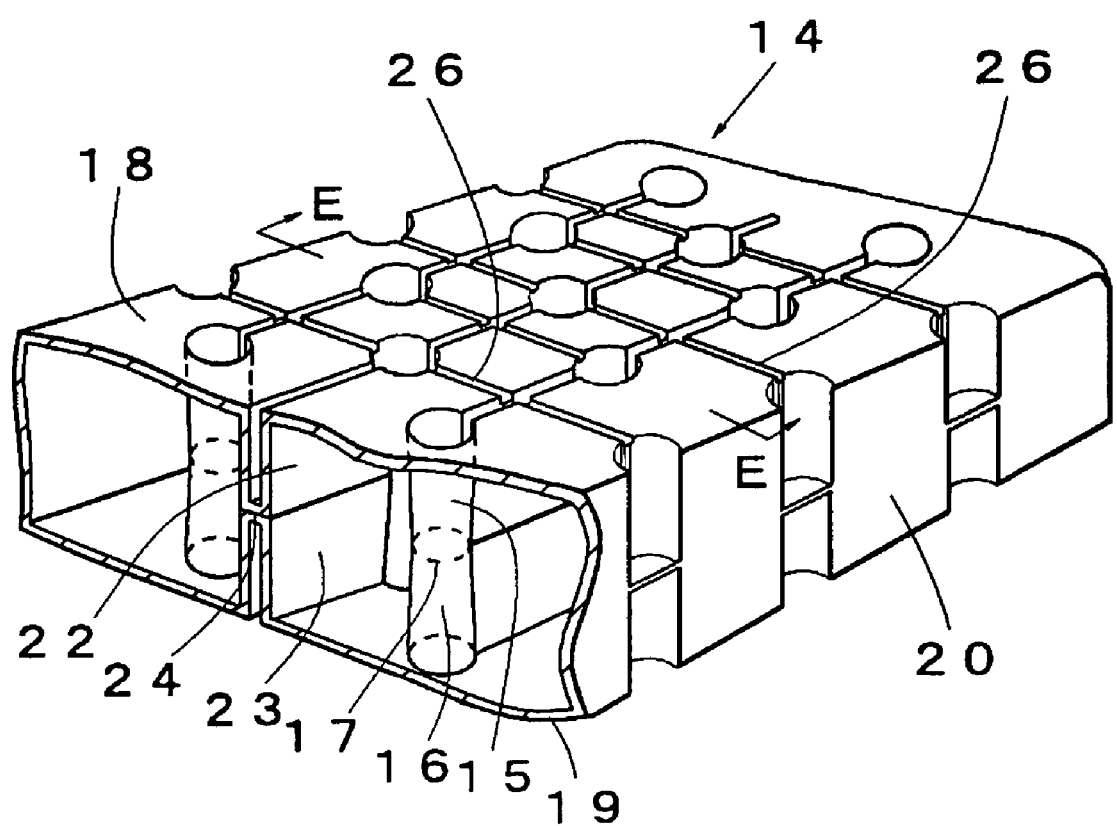
FIG. 11 is a broken perspective view showing a part of the other example of the hollow body constituting the impact-absorbing member of the motor vehicle in accordance with the second embodiment of the present invention.

As shown in FIG. 1 or 11, the connection rib 26 formed in on a virtual straight-line g having an approximate angle with respect to a horizontal line. The virtual straight-line g can be optionally selected in a range between 0 degree and 90 degrees with respect to a parallel line. However, the range between 30 degrees and 60 degree and 90 degree is preferable in view of the impact absorbing characteristic and the molding characteristic. In this case, the plate-like rib 22 is formed on the horizontal line in FIG. 11, and the connection rib 26 is formed on the virtual straight-line g having an angle of approximately 90 degree with respect to the horizontal line. In other words, the plate-like rib 22 and the connection rib 26 are formed in an approximately orthogonal direction, and supports each other, and it is possible to preferably prevent the concave rib and the plate-like rib from laterally collapsing with respect to the impact.

In the first and second embodiment in accordance with the present invention, the one concave rib 5 or 15 and the other concave rib 6 or 16 are arranged on the virtual straight-line g leaving a space with each other.

Figure 2:
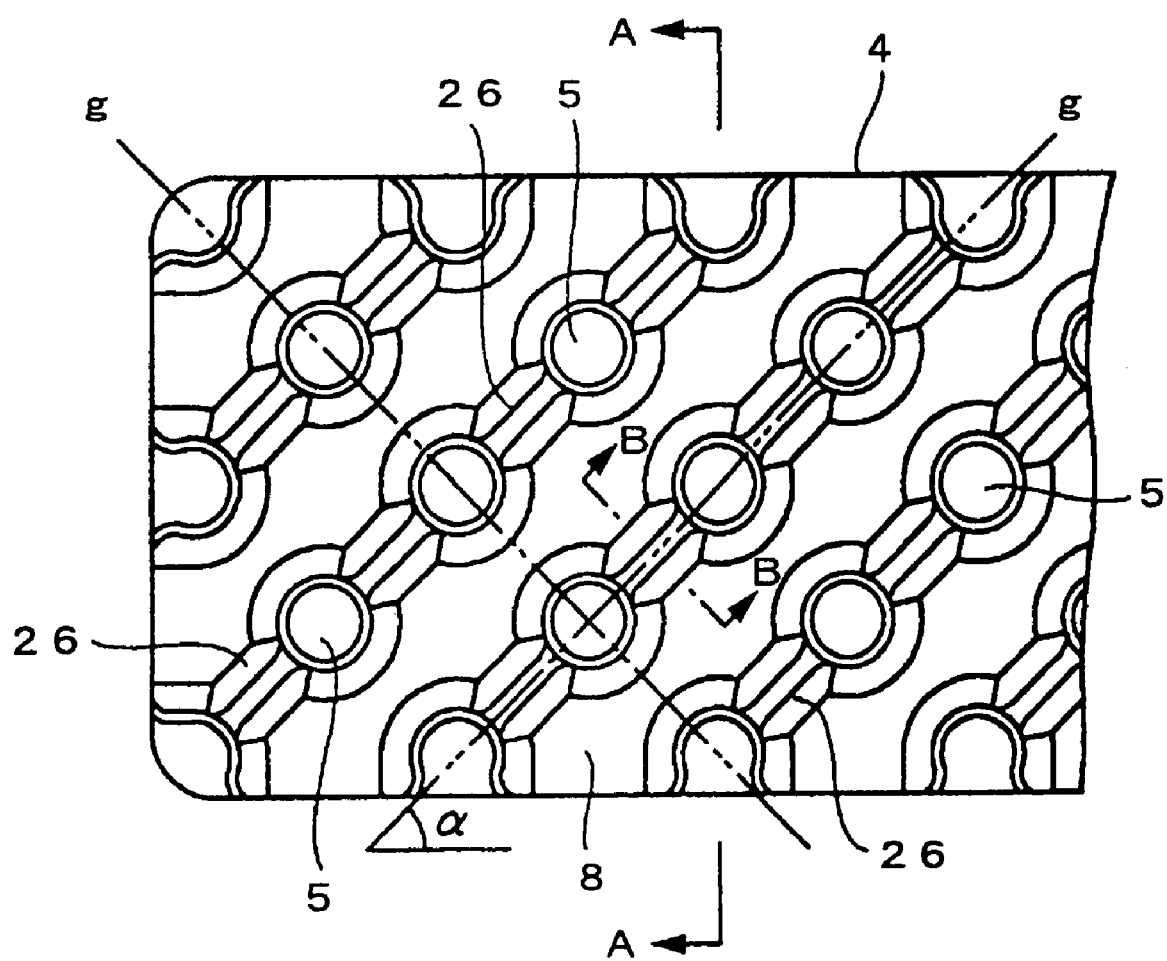
FIG. 2 is a front elevational view showing a part of a hollow body.
Figure 3:
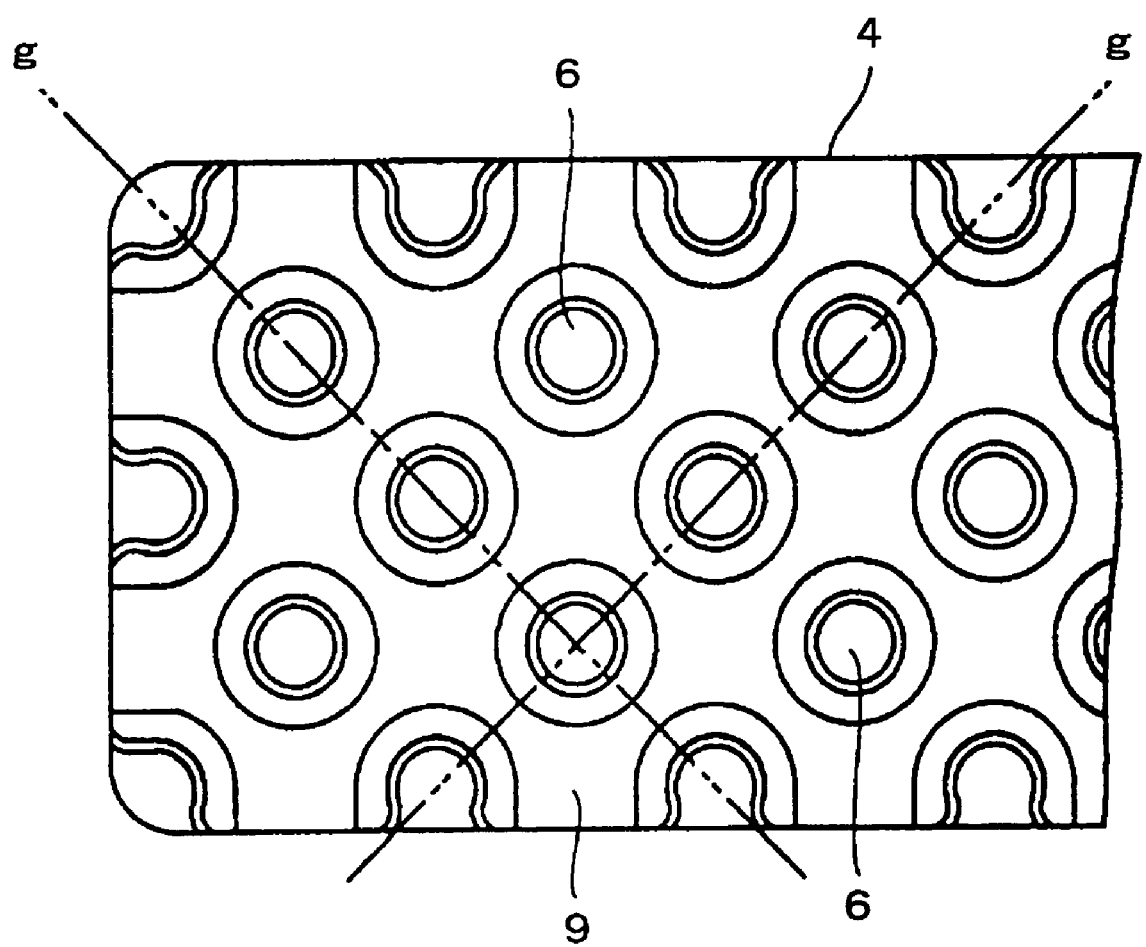
FIG. 3 is a back elevational view of the same.
Figure 4:
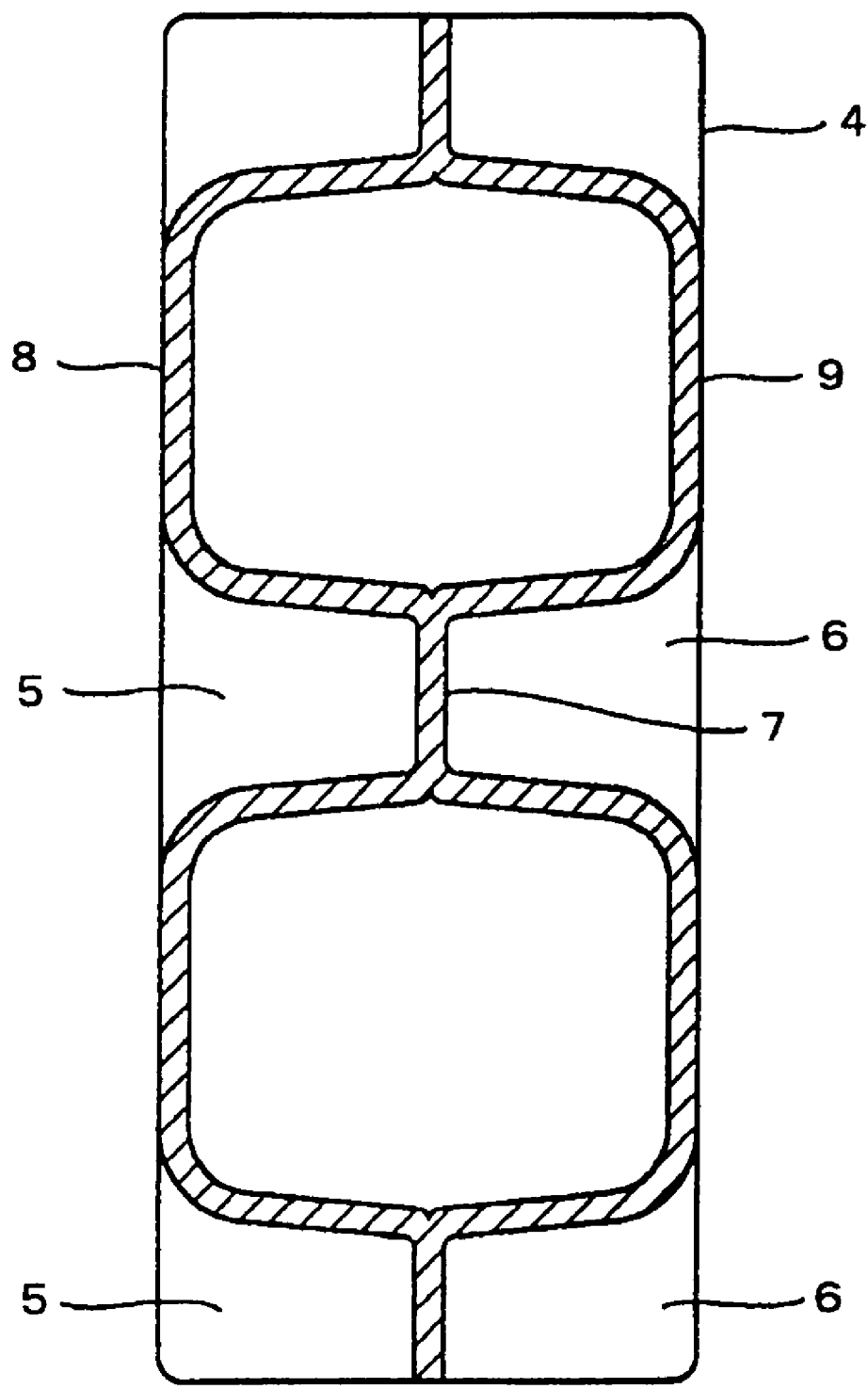
FIG. 4 is a cross sectional view along a line A-A in FIG. 2.

The connection rib 26 can be formed on the virtual straight line "g", and the virtual straight line "g" has an angle α between 30 and 60 degrees with respect to the horizontal line, as shown in FIG. 2. Further the added length of all the connection ribs 26 is set to be within a range between 20% and 60% of the added length of all the virtual straight lines "g" including the first wall 8 or 18, the second wall 9 or 19 and the peripheral wall 10 or 20.

In the case that the added length of all the connection ribs 26 is less than 20% of the added length of all the virtual straight lines "g" including the first wall 8 or 18, the second wall 9 or 19 and the peripheral wall 10 or 20, the rigidity of the impact absorbing member deteriorates, and the first wall 8 or 18 and the second wall 9 or 19 are contacted against the impact load from the external portion, that is, a so-called bottoming phenomenon is generated. On the contrary, in the case that the added length is more than 60%, the rigidity is increased too much and the cushioning performance deteriorates.

Figure 5:
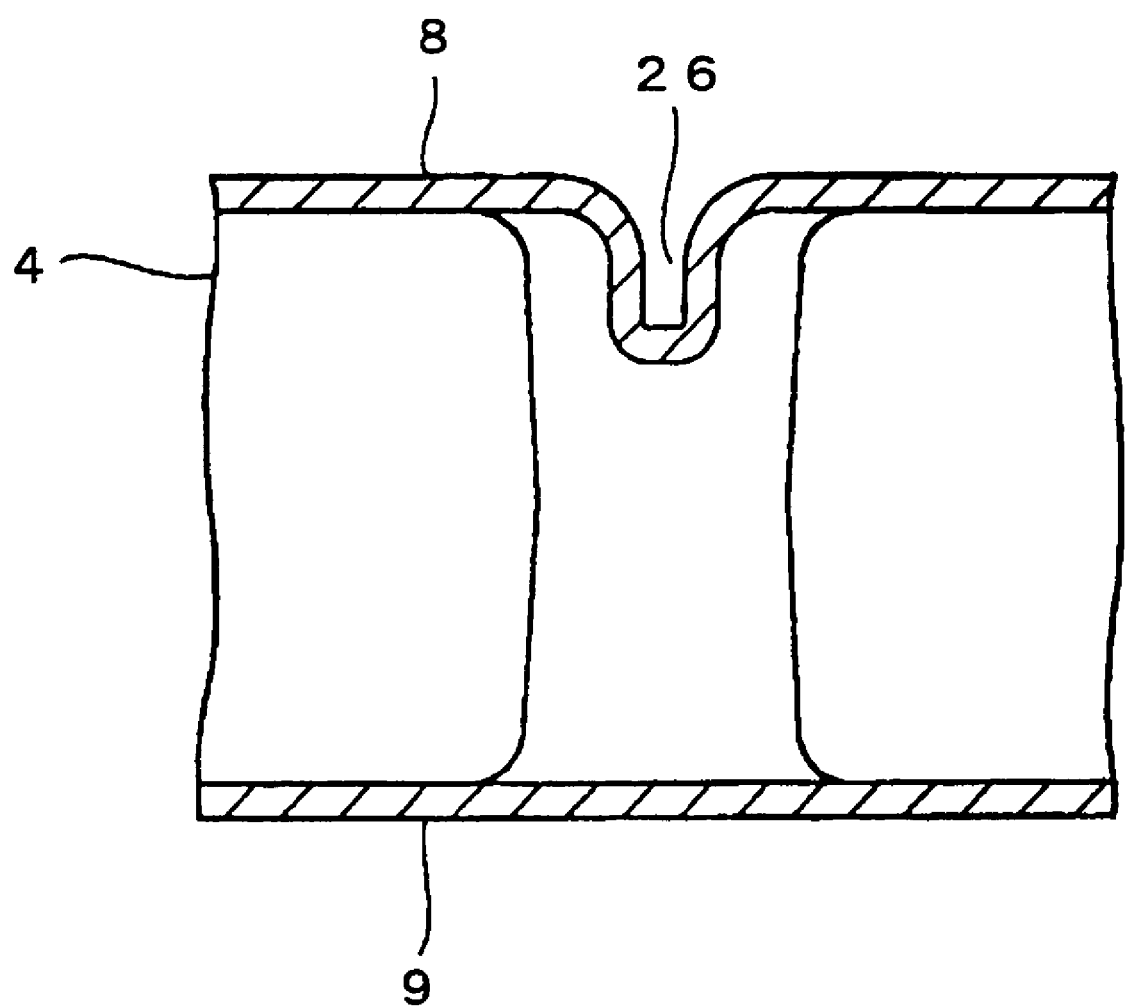
FIG. 5 is a cross sectional view along a line B-B in FIG. 2.
Figure 12:
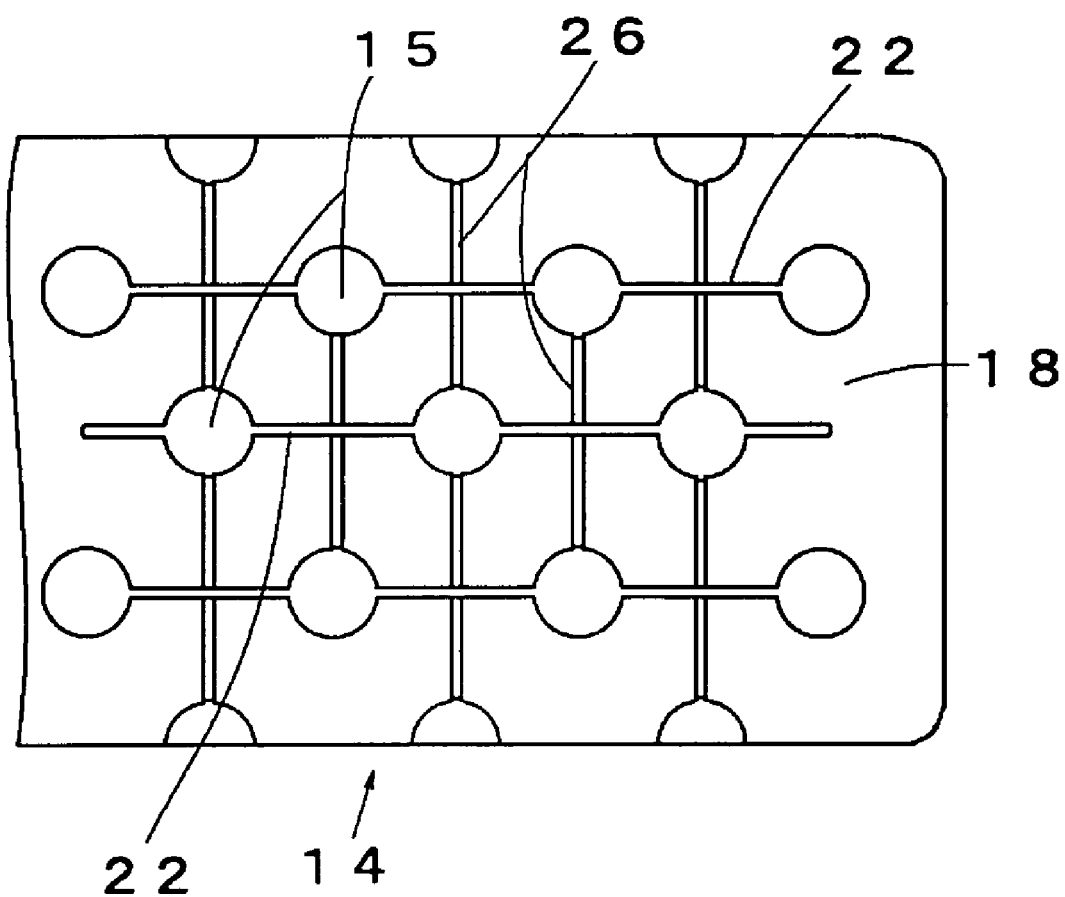
FIG. 12 is a front elevational view of FIG. 7.

Further, the connection rib 26 is not limited to the concave groove formed in the C-shaped cross section as shown in FIG. 5 or 12, but may be formed in a V-groove shape or in a plate shape in which two walls protruding to the inner side of the hollow portion are integrally formed. A depth of the connection rib 26 is between 3.0 and 8.0 mm.

In this case, in FIGS. 1 and 11, the connection rib is formed only in the first wall 8 or 18, however, the same connection rib may be formed in the second wall 9 or 19.

Figure 17:
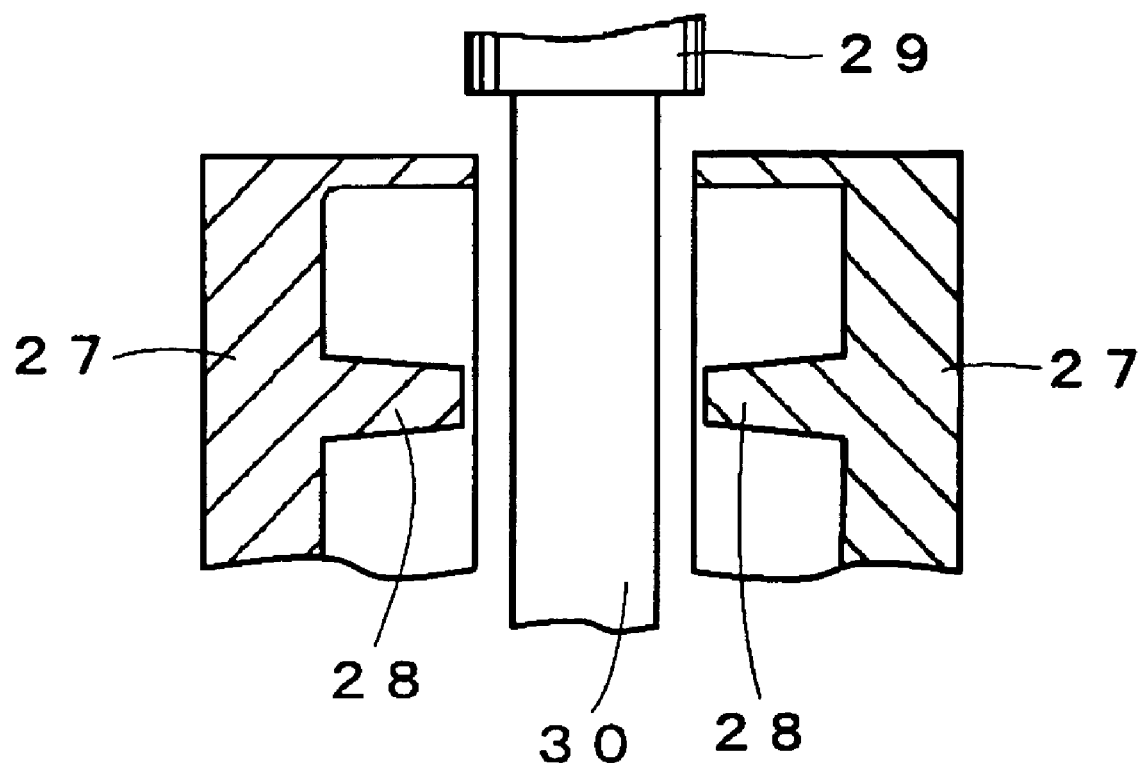
FIG. 17 is a cross sectional view showing a blow molding aspect of the impact absorbing member in accordance with present invention.
Figure 18:
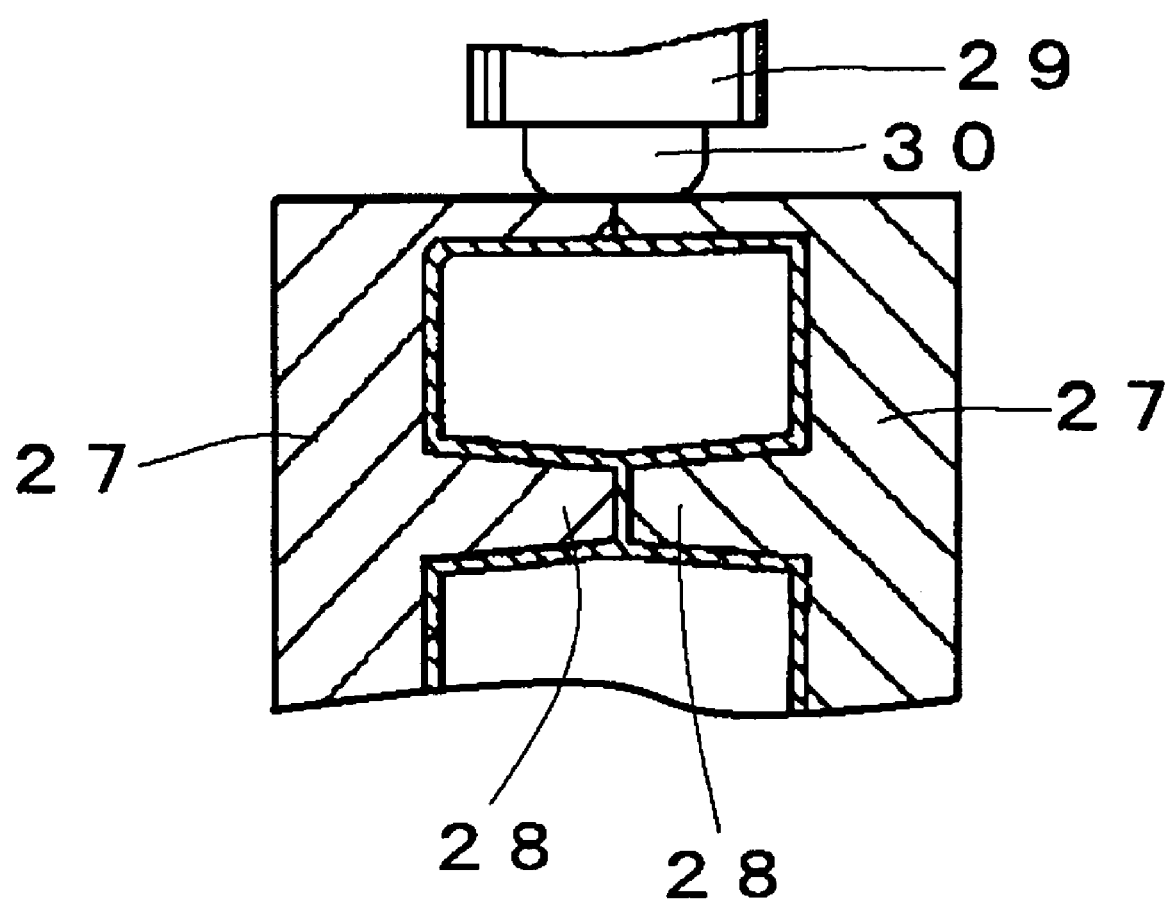
FIG. 18 is a cross sectional view of a blow molding clamping state of the same.

The hollow body 4 or 14 constituting the impact-absorbing member 1 or 11 of the motor vehicle in accordance with the present invention is blow molded as shown in FIGS. 17 and 18. In other words, reference numerals 27 and 27 denote a pair of separated metal molds, reference numerals 28 and 28 denote concave rib forming cavities, reference numeral 29 denotes an extruding die, and reference numeral 30 denotes a parison. As shown in FIG. 17, the parison 30 is arranged between a pair of separated metal molds 27 and 27, the molds are thereafter clamped as shown in FIG. 18, a pressurized fluid is introduced into the parison by sticking a blowing nozzle to the parison, and the parison is pressed to a cavity surface of the metal mold so as to form a shape of the hollow body. Accordingly, a pair of concave ribs 5 and 6 or 15 and 16 having the weld surface 7 or 17, a pair of plate-like ribs 22 and 23 having the weld surface 24 and the connection rib 26 are integrally formed in the hollow body.

A parting line (not shown) is formed in the hollow body formed in accordance with the blow molding along approximately all the periphery of the peripheral wall 10 or 20 on the basis of a pinch off by the separated metal molds 27 and 27, and a blowing hole (not shown) is formed as a trace obtained by sticking the blowing nozzle. The parting line is positioned approximately on the center in a height direction of the hollow body 4 or 14, and is formed approximately in all the periphery of the peripheral wall 10 or 20.

Next, a description will be given of results of experiments for comparing the embodiment of the impact-absorbing member of the motor vehicle in accordance with the present invention and a comparative embodiment.

EXAMPLE 1

An embodiment 1 uses an impact-absorbing member of a motor vehicle constituted by a bumper beam and a hollow body described below as in the structure shown in FIGS. 1 to 5.
Bumper beam: bumper beam made of high tensile steel plate and formed in a box-shaped cross sectional shape
Hollow body: hollow body formed by blow molding a shape shown FIGS. 1 to 5. A size thereof is 100 mm×40 mm×1200 mm, and an average thickness is 1.0 mm. An inner diameter of the concave rib is φ20 mm in a side of the front surface and φ10 mm in a side of the weld portion, in both of the first wall 8 and the second wall 9. The connection rib is formed in a concave groove shape, and a rate of an added length of all the connection ribs is 25% with respect to an added length of all the virtual straight lines g including the first wall 8, the second wall 9 and the peripheral wall 10. A synthetic resin employs polypropylene "AD571" (elastic modulus of bending 1050 MPa) produced by SUMITOMO MITSUI CHEMICAL CO., LTD.

EXAMPLE 2

Figure 6:
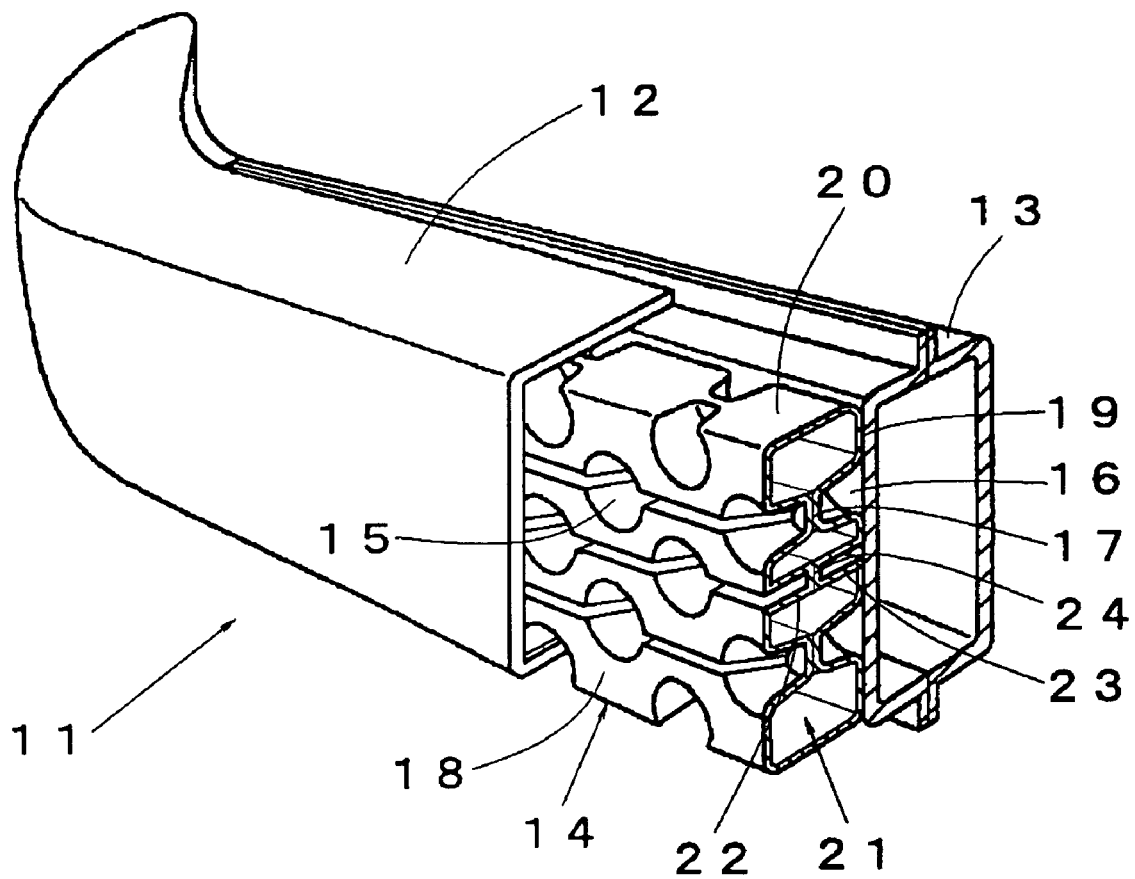
FIG. 6 is a broken perspective view showing a part of an impact-absorbing member of a motor vehicle in accordance with a second embodiment of the present invention.
Figure 7:
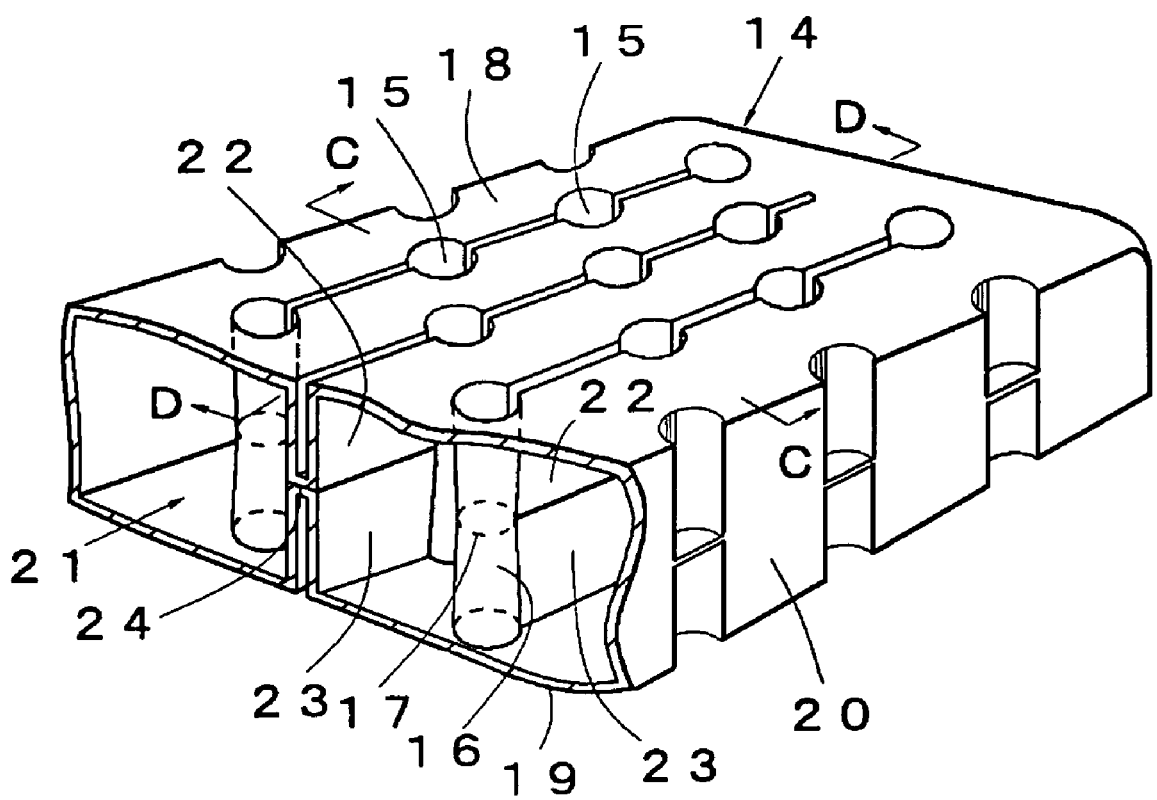
FIG. 7 is a broken perspective view showing a part of a hollow body.
Figure 8:
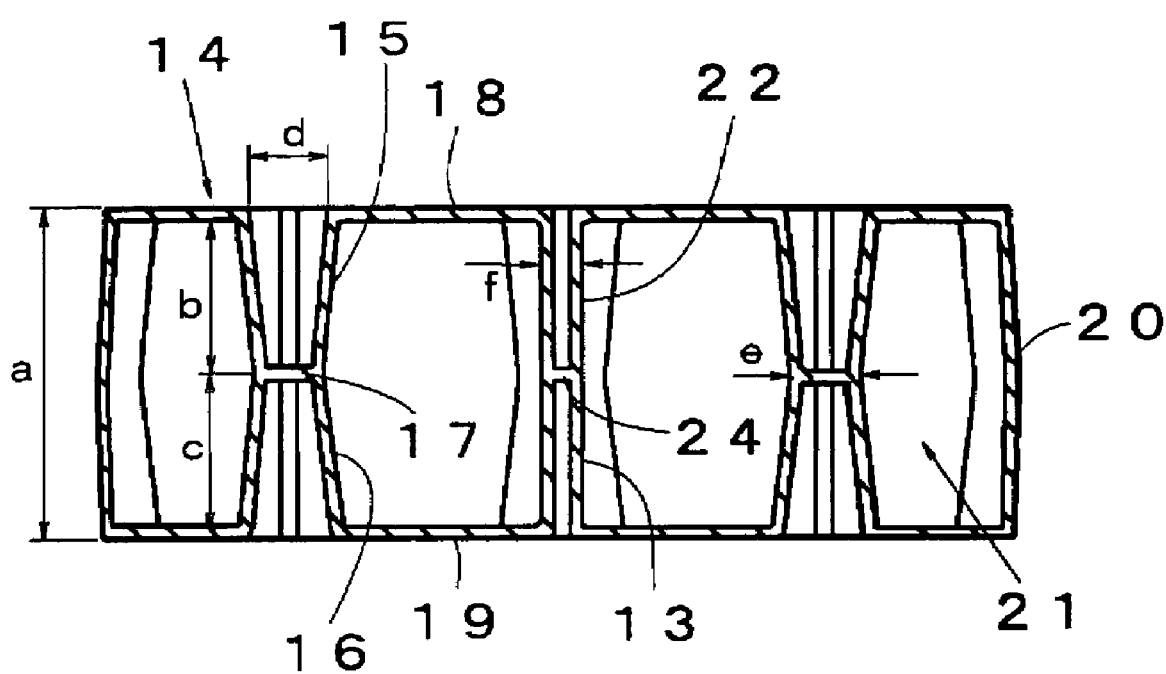
FIG. 8 is a cross sectional view along a line C-C in FIG. 7.
Figure 9:
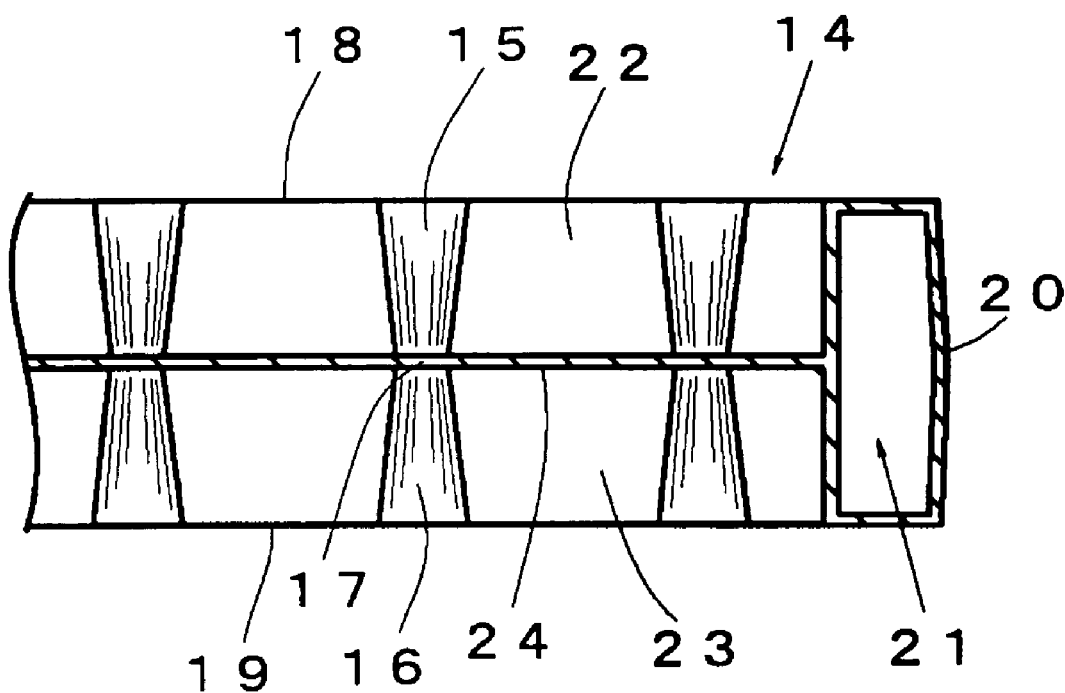
FIG. 9 is a cross sectional view along a line D-D in FIG. 7.
Figure 10:
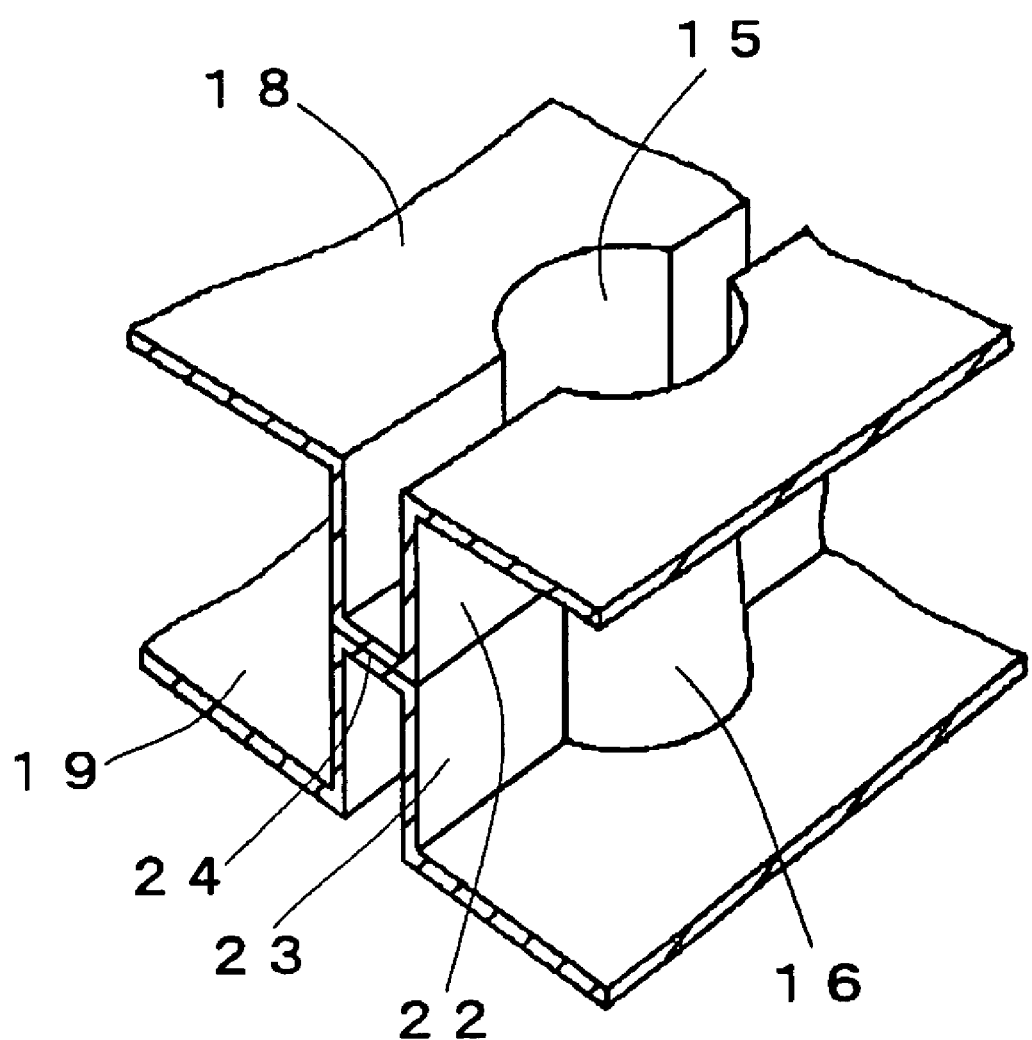
FIG. 10 is a broken perspective view showing a main portion of FIG. 7.
Figure 13:
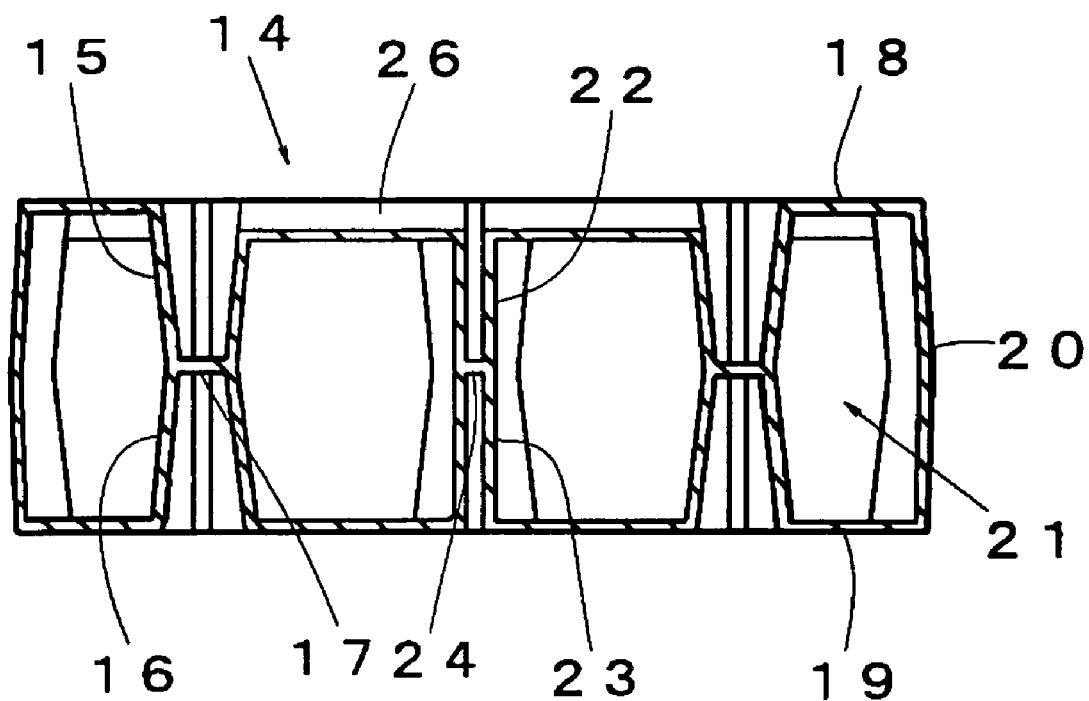
FIG. 13 is a cross sectional view along a line E-E in FIG. 11.

An embodiment 2 uses an impact-absorbing member of a motor vehicle employing a hollow body having a plate-like rib described in FIGS. 11 to 13 in the structure shown in FIG. 6. The same structure is employed as the impact-absorbing member of the motor vehicle in FIGS. 1 to 5 except an existence of the plate-like rib and an arrangement of the connection rib.

COMPARATIVE EXAMPLE

A comparative embodiment uses a polyurethane foam body in place of the hollow body in the embodiment.
Bumper beam: the same as the embodiment
Foam body: urethane foam of 2.5 kg/cm3
Next, the embodiment 1, the embodiment 2 and the comparative embodiment are compared, and evaluation thereof is shown in FIG. 16.

Figure 16:
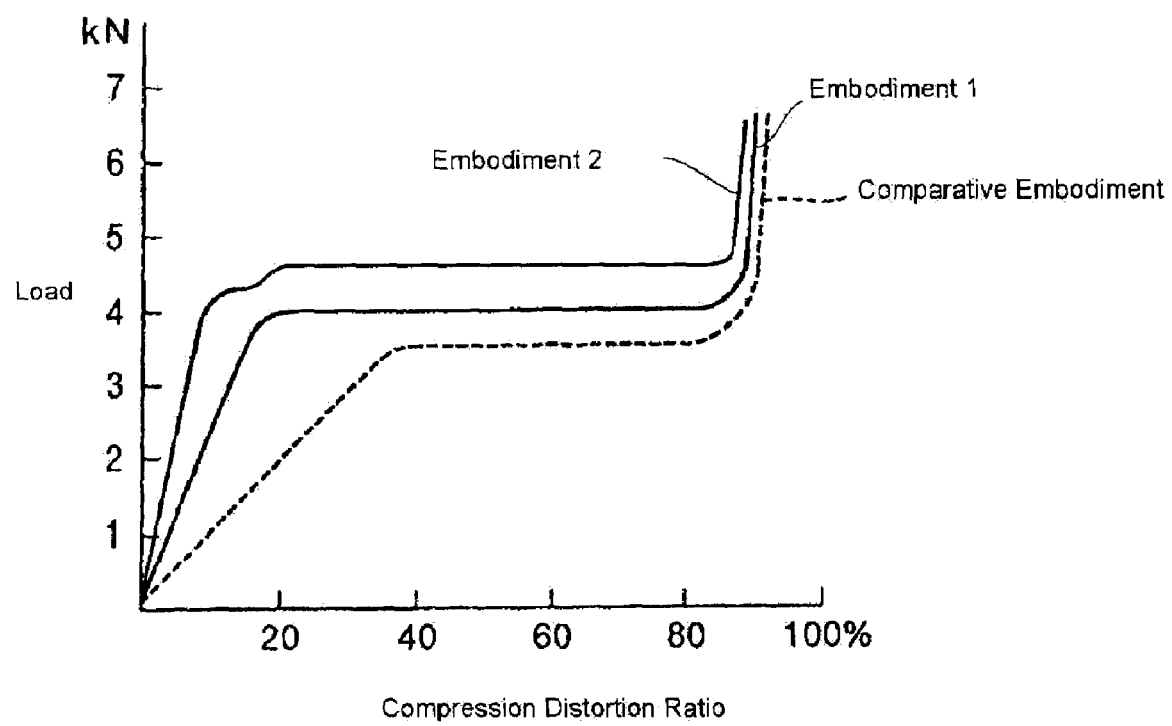
FIG. 16 is a graph showing a characteristic of the impact-absorbing member of the motor vehicle in accordance with the embodiment of the present invention and a characteristic of a comparative embodiment.

FIG. 16 is a graph obtained by applying the impact absorbing bodies in accordance with the embodiment 1, the embodiment 2 and the comparative embodiment to a collision tester. The collision tester is a collision tester manufactured by HODOGAYA GIKEN CO., LTD., and a columnar collision element having a mass of 20 kg, a leading end shape of φ 7 mm, and a length of 160 mm is collided at a speed of 20 km/h.

As is apparent from FIG. 16, the impact absorbing force is smaller in the comparative embodiment in comparison with the other embodiments. An impact absorbing value is obtained by an area of a portion surrounded by a curve and a horizontal axis below the curve. Since a slope just after the collision is gradual in the comparative embodiment in comparison with the other embodiments, the absorbing force of the comparative embodiment is lower. Further, since the comparative embodiment uses the polyurethane foam as the foam body, the polyurethane foam is broken to pieces due to the collision. Accordingly, a chatter noise is generated within the bumper due to the broken pieces, and the bumper cannot be reused once the impact is applied.

In the impact absorbing member 1 or 11 of the motor vehicle in accordance with the embodiment of the present invention, since the hollow body 4 or 14 made of plastic and is interposed between the bumper beam 3 or 13 in the side of the vehicle body and the bumper facia 2 or 12, the bumper beam 3 or 13 can absorb a high impact value (20 kN or higher) generated at a time when the motor vehicle equipped with the impact absorbing member 1 or 11 is collided with and brought into contact with another motor vehicle or another body. Further, a low impact value (5 kN or lower) generated at a time when the motor vehicle is collided or brought into contact can be absorbed by the hollow body 4 or 14.

In accordance with the structure of the embodiment 1, it is possible to maintain a high impact absorbing force as well as it is possible to obtain a sufficient impact absorbing value. Further, the hollow body 4 may be structured such that the hollow body 4 can be restored to its original shape after being collapsed by the low impact value, thereby being used repeatedly. Further, in accordance with the structure of the embodiment 2, it is possible to obtain particularly an impact absorbing performance just after the impact is applied, and it is possible to maintain a higher impact absorbing performance.

INDUSTRIAL APPLICABILITY

The impact absorbing member for the motor vehicle in accordance with the present invention is inward provided in the vehicle constituting member such as a door, a body side panel, a roof panel, a pillar, a bumper and the like of the motor vehicle or the like, whereby it is possible to extremely improve the impact absorbing performance in the portion, and it is possible to largely contribute to an improvement of safety of the motor vehicle. In accordance with the present invention, since the bumper beam made of metal or plastics is arranged in the side of the vehicle body, and the hollow body made of plastics is arranged in the side of the bumper facia, not only it is possible to absorb the high impact value (20 kN or higher) generated at a time of being collided with, and brought into contact with the other motor vehicle or the other body, but also it is possible to correspond to the low impact value (5 kN or lower), whereby it is possible to obtain the impact absorbing member of the motor vehicle which is excellent in the function characteristic and the flexibility for styling.

The invention claimed is:
1. A system for absorbing an impact to a motor vehicle comprising:
   a bumper beam;
   a bumper facia; and
   a hollow impact absorbing member interposed between said bumper beam and said bumper facia comprising:
   a first wall disposed against said bumper beam;
   a second wall disposed against said bumper facia, said first wall is spaced from said second wall to define a hollow space;
   said hollow space is further defined by a peripheral wall extending from peripheral edges of said first and second wall;
   a first plurality of concave ribs extending from said first wall into said hollow space towards said second wall and is proximal to said second wall whereby said first plurality of concave ribs occupies a portion of said hollow space;
   a second plurality of concave ribs extending from said second wall into said hollow space towards said first wall and is proximal to said first wall whereby said second plurality of concave ribs occupies a portion of said hollow space; and
   a weld surface supported by said first plurality of concave ribs in one direction and supported by said second plurality of concave ribs in another direction
   wherein said weld surface is formed in an approximately circular shape, has a diameter between 5.0 and 15.0 mm and is disposed approximately half way between said first and second walls; and
   said bumper beam absorbing a impact in case of affected high impact applied and said hollow impact absorbing member absorbing a impact in case of affected low impact of 5 kN or less applied to the bumper facia.

2. The hollow impact absorbing member of claim 1 further comprising a first plate-like rib extending into said hollow space from said first wall towards said second wall; a second plate-like rib extending into said hollow space from said second wall towards said first wall; and said first and second plate-like ribs are integrally welded to each other whereby said hollow space is partitioned.

3. The hollow impact absorbing member of claim 2, wherein said first and second plate-like rib are terminated with at least one concave rib.

4. The hollow impact absorbing member of claim 3 further comprising a first connection rib interposed between a pair of said first concave ribs.

5. The hollow impact absorbing member of claim 4 further comprising a second connection rib interposed between a pair of said second concave ribs.

6. The hollow impact absorbing member of claim 4 wherein said first connection rib forms a protrusion in said hollow space having a depth between 3.0 and 8.0 mm.

7. The hollow impact absorbing member of claim 6, wherein said first connection rib has a cross section selected from a group of shapes consisting of: a "C", a "V" and a plate.

8. The hollow impact absorbing member of claim 4, wherein said first concave rib and first connection rib are arranged on a first virtual straight line.

9. The hollow impact absorbing member of claim 8, wherein said first virtual straight line has an angle within a range between 30 degrees and 60 degrees with respect to a horizontal line.

10. The hollow impact absorbing member of claim 5, wherein said second concave and second connection rib are arranged on a second virtual straight line.

11. The hollow impact absorbing member in claim 1, further comprises a first height from said first wall to said weld surface, wherein said first height is between 15.0 and 35.0 mm; a second height from the said second wall to said weld surface, wherein said height second height is between 15.0 and 35.0 mm; and a third height from said first wall to said second wall, wherein said third height is between 30.0 and 70.0 mm.

12. The hollow impact absorbing member of claim 1, wherein said concave rib forms a frustum of a cone having a major diameter between 15.0 and 30.0 mm and a minor diameter between 5.0 and 15.0 mm, whereby said minor diameter of said concave rib is positioned in said hollow space.

13. A system for absorbing an impact to a motor vehicle comprising:
   a bumper beam;
   a bumper facia; and
   a hollow impact absorbing member interposed between said bumper beam and said bumper facia comprising:
   a first wall abutting said bumper beam;
   a second wall abutting said bumper facia, said first wall is spaced from said second wall
   to define a hollow space;
   said hollow space is further defined by a peripheral wall extending from peripheral edges of said first and second wall;
   a separating structure spaced between said first wall and said second wall, whereby said hollow space defined by said first and second wall resists deformation when an impact energy is applied;

a supporting structure abutting at least two of said separating structure, whereby said supporting structure limits deformation of said separating structure when an impact energy is applied a parting line disposed on said peripheral wall approximately halfway between said first and said second wall; and said bumper beam configured to absorb an impact in case of affected high impact applied to said bumper fascia and said hollow impact absorbing member configured to absorb a impact in case of an affected low impact of 5 kN or less applied to said bumper facia.

14. The hollow impact absorbing member of claim 13, wherein said supporting structure comprises a first fused portion of said first wall extending into said hollow space towards said second wall and a second fused portion of said second wall extending into said hollow space towards said first wall.

15. The hollow impact absorbing member of claim 13, wherein said supporting structure comprises a first folded portion of said first wall extending into said hollow space toward said second wall and a second folded portion of said second wall extending into said hollow space toward said first wall.

16. The hollow impact absorbing member of claim 13 further comprising a reinforcing core material deposited within said supporting structure.

17. The hollow impact absorbing member of claim 16, wherein said reinforcing core material is plastic.

18. The hollow impact absorbing member of claim 16, wherein said reinforcing core material is metal.

19. A method for absorbing an impact to a motor vehicle comprising:

interposing a hollow impact absorbing member between a bumper beam and a bumper fascia;

separating a first wall of said hollow impact absorbing member from a second wall of said hollow impact absorbing member at a distance with a plurality of concave ribs;

stabilizing a portion of said plurality of concave ribs with a plurality of plate-like ribs;

said bumper beam configured to absorb an impact in case of an affected high impact applied to said bumper fascia and said hollow impact absorbing member absorbing an impact in case of an affected low impact of 5 kN or less applied to said bumper facia.

20. The method of claim 19 further comprising depositing a reinforcement material within said plurality of plate-like ribs.

21. The method of claim 19 further comprising interspersing a plurality of connection ribs between said plurality of concave ribs and arranging said plurality of connection ribs and said plurality of concave ribs on plurality of virtual lines orientated 30 to 60 degrees from horizontal.

* * * * *